United States Patent Office 2,858,279
Patented Oct. 28, 1958

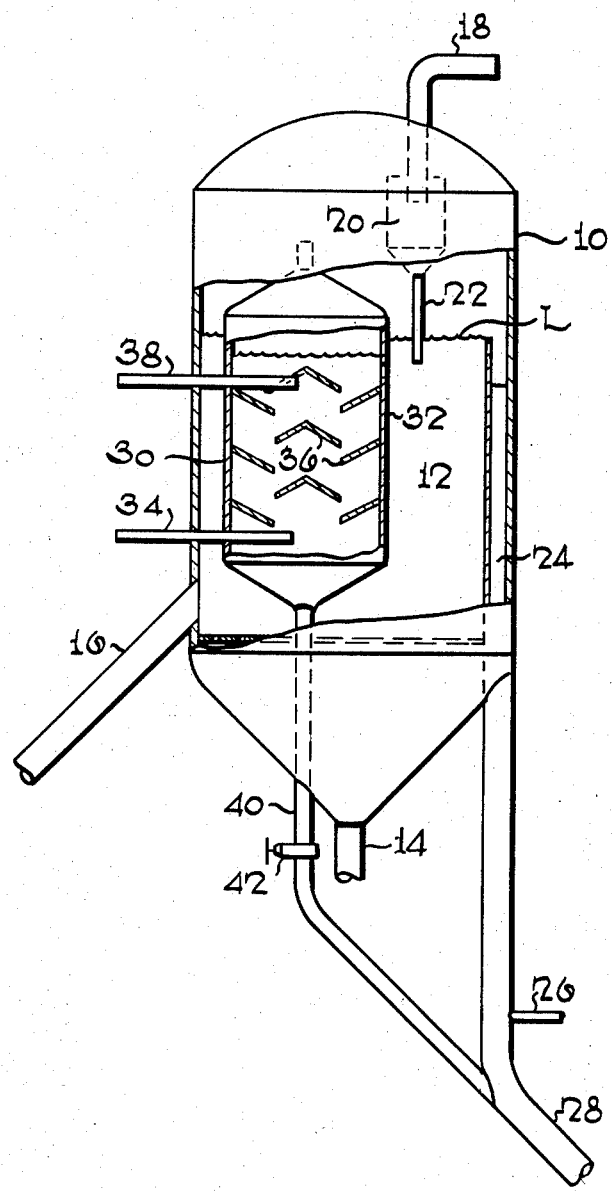

2,858,279

METHOD OF DRYING A FLUID HYDROFORMING CATALYST

William P. Drews, Elizabeth, N. J., assignor to Esso Research and Engineering Company, a corporation of Delaware Application September 30, 1952, Serial No. 312,307

7 Claims. (Cl. 252—417)

This invention relates to the catalytic conversion of hydrocarbons, more particularly to a process for the catalytic hydroforming of naphthas using a fluidized solid catalyst, and especially to a means for controlling the moisture content of a catalyst circulating between a hydroforming reaction stage and an oxidative regeneration stage in which the carbonaceous deposit formed during the hydroforming process is burned off by combustion at a temperature higher than the hydroforming reaction.

Catalytic hydroforming is a well-known and widely used process for treating hydrocarbons in the naphtha boiling range to convert them to more useful products, having ordinarily a higher content of aromatic hydrocarbons. The process has been used widely in recent years to produce pure aromatic hydrocarbons, and has become a major source for synthetic benzene toluene, and the xylenes. Another and increasingly important use has been in the conversion of broad range naphtha cuts, into motor fuels and blending agents of greatly improved anti-knock and volatility characteristics. The hydroforming process has been particularly valuable in this connection because of the facility with which it can be used on converting products having relatively poor motor fuel characteristics into products of premium quality.

Catalytic hydroforming consists essentially of a process for treating hydrocarbon vapors with a highly active conversion catalyst, in the presence of a hydrogen atmosphere which helps to suppress side reactions leading to coke formation. At the same time the temperature, pressure and catalyst and reactant feed rates are controlled so that the reaction results in an overall net production of hydrogen. A variety of isomerization and hydrogen transfer reaction may be involved including dehydrogenation, paraffin and naphthene isomerization, cyclization or aromatization. Catalysts employed for this purpose include a variety of group IV to group VIII metals, their oxides or sulfides supported on an adsorptive catalyst carrier. Particularly useful results have been found with the oxides of group VI metals of variable valence such as molybdenum, chromium or tungsten, supported on an adsorptive material such as active alumina or zinc aluminate. Carriers of this type consist commonly of a hydrous oxide gel which has been activated by partial dehydration at elevated temperatures, usually in the presence of an atmosphere of superheated steam.

The degradation of feed stock to carbon on the catalyst is kept to a minimum by the presence of a hydrogen atmosphere. However, with many of the most active catalysts it cannot be entirely avoided. Even where it can be avoided, by operating at a controlled severity, experience has shown that products of the highest octane number can be obtained only under the most severe conversion conditions where a carbonaceous deposit is laid down on the catalyst. In view of the fact that catalytic hydroforming is a strongly endothermic process, the removal of such a carbonaceous deposit by oxidative regeneration represents an important source of heat to supply the necessary heat of reaction.

The operating cycle may be considered to start with an onstream period in which regenerated catalyst is exposed to the action of hydrogen and hydrocarbons. The most active state of the catalytic oxides employed in the hydroforming catalysts is commonly one which corresponds to intermediate valence state. With molybdena, for example, the active form corresponds more closely to $Mo_2O_5$ than to $MoO_3$, and with chromia it is $Cr_2O_3$ rather than $CrO_3$.

The spent catalyst entering the regeneration zone actually undergoes two types of oxidation. Coke on the catalyst is burned off by the usual combustion reactions, which are catalyzed in this case by the active component of the hydroforming catalyst so that it is relatively simple to obtain complete regeneration in the sense of substantially complete carbon removal at a regeneration temperature range from about 1050° to 1250° F. The maximum desirable regeneration temperature is limited by the expense of materials of construction suitable for withstanding temperatures in excess of 1200° F., and by the fact that alumina exposed to temperatures substantially higher than about 1300° F. undergoes a phase change to the alpha alumina form which is not active as a catalyst carrier.

At the same time, the partly reduced oxide in the catalyst is oxidized more or less completely to its highest valence state, which would be $MoO_3$ for molybdena or $CrO_3$ for a chromium-type catalyst. The catalyst thus reoxidized may be partly reduced again in a separate pretreating stage before it enters the reaction zone. In other cases, it may be introduced directly into the reaction zone in the fully oxidized state and reduced therein by the action of hydrocarbon vapor and hydrogen-containing gas. This cycle occurs each time the catalyst is removed from the conversion zone and passed through the regeneration zone, so that it is an important factor in considering the overall effects of increased catalyst circulation rate.

Both the coke burning and catalyst reoxidation are exothermic processes, releasing heat which may be used to advantage. A portion of this heat may be conveyed directly to the reaction zone as sensible heat of hot regenerated catalyst. A number of other means may be employed to cool the regenerator and recover this heat, including a circulating inert solid in direct or indirect heat exchange with the reactor fluid bed, the indirect exchange of heat between the reactor and regenerator fluid beds, or heat exchange with vent gases, as well as by using conventional means of heat recovery such as a waste heat boiler.

The present invention is particularly concerned with the effects of water formed during the regeneration stage of this operating cycle, and during the pretreating stage. The spent catalyst entering the regeneration zone includes substantial amounts of hydrogen, both as a part of the carbonaceous deposits formed during the hydroforming reaction and in the form of adsorbed or chemisorbed hydrogen carried along with the spent catalyst. Appreciable quantities of water are thus formed during combustion of this adsorbed or chemically combined hydrogen, and further amounts of water are formed in any pretreatment of the regenerated catalyst to reduce its valence state by reduction with hydrogen. This water tends to be strongly adsorbed on the surface of the carrier, where it has a pronounced effect on catalyst behavior. Experience has shown that excessive amounts of water are harmful to the activity and selectivity of the catalyst during the hydroforming stage of the cycle. However, these harmful effects can be substantially completely avoided if excess moisture formed or present during other stages of the cycle can be removed before the catalyst enters the reaction zone.

The effects of excess moisture on the catalyst in a normal operating cycle can be clearly seen from comparative tests. This may be illustrated by the results of a series of runs in which a catalyst consisting of 10% of molybdic oxide on active alumina was predried by treatment with hydrogen for 15 minutes at 900° F., then used at 900° F. in hydroforming a virgin heavy naphtha feed stock. With 3800 cubic feet per barrel of hydrogen dilution, at various liquid feed rates in the range of about 0.30 w./hr./w., the effect of added moisture was determined by adding varying amounts of water vapor to the diluent hydrogen. The results of these comparative tests as presented in Table 1 show the effects of this excess water on product octane quality at a given constant feed rate, and on yield distribution and allowable feed rates at a constant octane level.

*Table 1*

[Effects of added water, at 900° F. reactor temperature; heavy naphtha feed, 3800 cu. ft./bbl. $H_2$ gas feed rate.]

| Water, mol percent on $H_2$ fed | 0 | 1 | 3 | 9 |
|---|---|---|---|---|
| Effects on Activity, $C_5$—430° Product (constant 0.3 w./hr./w. catalyst rate):[1] | | | | |
| O. N., Research clear | 91.2 | 90 | 88 | 83 |
| Effects on Selectivity (constant 91 Res. O. N. level): | | | | |
| Gasoline, vol. percent, $C_5$—430° F | 81.8 | 80.7 | 79.5 | 78.6 |
| Gasoline, R. V. P | 3 | 3 | 3 | 3 |
| Total $C_4$, vol. percent | 6.0 | 7.6 | 9.0 | 10.9 |
| Dry Gas, wt. percent | 10 | 10 | 10 | 10 |
| Carbon, wt. percent | 0.32 | 0.50 | 0.72 | 0.84 |
| Feed rate, w./hr./w.[1] | 0.30 | 0.28 | 0.24 | 0.16 |

[1] W./hr./w.=weight space velocity, pounds of oil per hour per pound of catalyst in the reactor.

Even small amounts of added water cause a pronounced drop in the activity of the catalyst, indicated by the loss in product octane quality at constant feed rates. The extent of this harmful effect is emphasized by considering its effects on selectivity, since product yield goes down at a constant research octane level while both dry gas and carbon increase. At the same time, the maximum feed rate which can be used while maintaining constant product quality drops rapidly. These results show clearly the undesirable effects of excess moisture, on both the yields and the product quality which can be realized.

These results were obtained with a normally dry catalyst. It should also be recognized that overdrying at elevated temperatures is distinctly undesirable, leading to poor selectivity with high gas and carbon formation for a given product octane quality.

While the desirability of removing excess moisture produced during the regeneration has been appreciated, experience has shown that this moisture is very tightly held on the catalyst. It is by no means sufficient to simply strip the regenerated catalyst stream to remove occluded gases. Surprisingly enough, even a very large stripping gas rate at elevated temperatures is frequently insufficient. The chief operating variables seem to be the temperature of the stripping process, the composition of the stripping gas, and particularly the time for which the solid is exposed to the striping action. Any heating of the regenerated catalyst above regeneration temperature is a very expensive process and one which presents danger of catalyst deactivation. Thus, it is particularly desirable to carry out the stripping at a temperature as close as possible to the highest which can be realized in the regenerator itself. One obvious solution to this problem has been to provide a large stripping zone in series with the regenerator, with a pre-heated stripping gas and a long residence time sufficient to produce the desired degree of water desorption. This requires what amounts to an additional vessel, and a material increase in catalyst inventory.

The applicant has now found that the rate of water absorption is slow, as well as the rate of water desorption, and that advantage may be taken of this fact to keep the water level in the circulating stream of catalyst low without requiring the total volume of catalyst to be continuously dehydrated each time it passes through the regeneration zone.

It is an object of this invention to provide a process whereby water formed during the regeneration of a spent hydroforming catalyst is removed by a special drying procedure.

It is a further object of this invention to provide a process allowing an extended period of time for the drying of a portion of the regenerated catalyst, to prevent the build-up of high moisture contents in the catalyst circulating system. Another object is to avoid over-drying of the regenerated catalyst by providing separate streams of carefully dried and ordinary stripped catalyst, which may be blended to a desired average water content.

It is a still further object of this invention to provide a method for drying a regenerated catalyst with minimum heat requirements for maintaining the temperature of the stripping gas and the regenerated catalyst undergoing stripping, while maintaining this temperature at a controlled high level to promote efficient stripping.

These and other objects will appear more clearly from the following discussion, illustrated by reference to the attached drawing which presents a diagrammatic showing of one embodiment of the invention.

In the drawing, vessel 10 is a regenerator containing a fluid bed of catalyst 12 undergoing regeneration by the action of an oxidizing gas introduced upwardly through line 14 at or near the bottom of the vessel. Spent catalyst, withdrawn from a hydroforming vessel not shown, is introduced into regenerator 10 at some suitable point by way of inlet line 16. The catalyst within the regeneration vessel is maintained in the form of a dense turbulent fluid bed by the action of the regeneration gas, which flows upwardly at a fluidizing velocity which is within the range of about 0.05 to 2 ft. per second where the regeneration pressure is about 200 p. s. i. g., depending somewhat upon the pressure and temperature of the regeneration process. The regeneration vent gases are removed overhead from the vessel through line 18 and are ordinarily passed first through a separating device such as cyclone 20 provided with a dip leg 22 for removing entrained particles from the spent gas before it is vented from the system.

The regeneration gas introduced through line 14 may be air, or air diluted with another gas such as a flue gas, inert, or steam. The carbonaceous deposits on the spent catalyst introduced into the regenerator are removed by the action of this oxidizing gas. This reaction in the fluid bed is completed ordinarily in an average residence time of from about 5 minutes to 30 minutes, at a regeneration temperature in the range of about 1100° to 1300° F. Regenerated catalyst is withdrawn from fluid bed 12 through an overflow weir leading to a standpipe 24. This standpipe serves as a stripping section, where a small amount of dry inert gas introduced at a lower level through line 26 flows upwardly countercurrent to the descending stream of catalyst in the standpipe. The short time exposure of the hot catalyst to a dry gas atmosphere in this standpipe is sufficient to strip the occluded water-containing regeneration fumes from the interstices between the catalyst particles. The regenerated catalyst withdrawn through standpipe 24 is conveyed through line 28, either directly or after further pretreatment if desired, into the hydroforming reactor.

The residence time in the stripping standpipe 24 is too short, even in the presence of the inert stripping gas introduced through line 26, to effect the desired degree of water removal from the catalyst particles themselves. A separate small stream of catalyst to be dried with a longer contact time between the drying gas and the catalyst is therefore passed through the internal stripper or drying zone 30 positioned within the regenerator. Catalyst from fluid bed 12 within the regenerator enters this drying zone through one or more lateral openings 32 located at a point below the level L at the top of bed 12. The hot catalyst entering vessel 30 flows downward countercurrent to a stream of dry inert gas introduced through line 34 at the bottom of the internal stripper. The efficiency of contacting between this drying gas and the regenerated catalyst being stripped thereby may be improved by the use of suitable mechanical devices such as disc and donut baffles 36 or their equivalent.

The efficiency of stripping within this drying vessel 30 may be improved, if desired, by introducing an auxiliary hydrogen-containing gas through line 38 entering the stripping zone at an upper level. Experience has shown that much more rapid stripping of water from the adsorptive gel carriers may be obtained with a hydrogen-containing gas than with any other stripping medium. The inclusion of a small amount of hydrogen at this point also serves to pretreat the freshly regenerated catalyst to cause at least partial reduction of the fully oxidized material, thus removing an additional amount of water from the operating cycle before the catalyst enters the reaction zone. Where such an auxiliary gas stream is employed, its amount may be such that its hydrogen content is essentially completely consumed before the stripping gas is vented from vessel 30. If the use of a larger amount of this gas is desired, it may be preferable to provide a separate vent line, not shown, to avoid the unnecessary release of heat in the disperse phase about bed 12 which might take place on combining residual hydrogen from vessel 30 with residual oxygen from the regeneration air supply.

The dry inert gas used for stripping both in the standpipe 24 and in the separate stripper 30 should contain not more than about 0.5 to 1 mol percent of water. This is roughly equivalent to the amount of water in what is ordinarily considered as dry air. An inert gas of this composition may be prepared in various ways. It may be produced for example by burning a relatively pure form of carbon with air. Such a carbon may be coke having very low hydrogen content such as a coal coke or a petroleum coke which has been preoxidized at high temperature. In the particular embodiment shown here, a suitable inert gas may be obtained most conveniently by recirculating a portion of the flue gas vented from the regenerator at 200 lbs. pressure, after cooling at this pressure to a temperature not above about 100° F. to condense out excess water. The presence of carbon dioxide or small amounts of carbon monoxide in the inert gas to be used in this way has no particular harmful effect, and can be ignored.

The stripped catalyst removed at the bottom of drying zone 30 is conveyed through a separate withdrawal standpipe 40. The rate at which catalyst is withdrawn and stripped in drying zone 30 can be specifically controlled by any suitable means of flow rate control such as valve 42 located in line 40. The residence time in the drying zone 30 is a function of the rate at which catalyst flows into and through this zone and out through line 40. This time will ordinarily be within the range of from about 10 to 60 minutes or somewhat longer, preferably about 20 to 30 minutes. This represents a 10-to-100-fold increase over the stripping time provided in standpipe 24, and this gain in time is of major importance in obtaining adequate drying.

The size of the drying vessel 30 is also related to the stripping time of residence, with a larger diameter stripping zone corresponding to a longer drying time. As a specific example, a drying zone having a cross-sectional area representing 25% of the regenerator bed area would give a residence time of 25 minutes in the drier for a residence time of 10 minutes in the regenerator, with the amount of catalyst withdrawn through standpipe 24 being 10 times that withdrawn from the drier outlet 40. Assuming a typical residence time of 30 seconds in standpipe 24, the catalyst in vessel 30 would thus have 50 times as long a contact with stripping gas as the catalyst in the main standpipe-stripper 24.

Placing the drying stripper 30 within the fluid bed 12 is a simple means of maintaining the stripping vessel at the highest practical temperature. In a typical operation as described above, this may be a temperature in excess of about 1050° F., when the regeneration bed is at about 1150–1200° F. With a somewhat lower regeneration temperature the stripping temperature will be correspondingly lower, and the process may be employed to advantage while stripping at any desired temperature higher than that of the hydroforming reaction.

No heat losses are incurred either from the stripping vessel or in the flow path between the regeneration vessel and the stripper. As a matter of fact, some excess heat is frequently available from the regeneration process. In this case, the dry inert introduced through line 34 may easily be introduced at ambient temperatures to absorb heat released near the bottom of fluid bed 12, heating the inert stripping gas and cooling the fluid bed in the regenerator. Both the bed 12 and the catalyst within vessel 30 are in the turbulent fluid state, as stated above, so that a rapid transfer of heat takes place through the walls of vessel 30.

By continuously drying a small aliquot portion of the total circulating catalyst in this way, the average level of water content on the catalyst can be maintained at a desired low value. At the same time over-drying can be avoided readily by controlling the ratio of dry catalyst to total catalyst circulation, as well as by controlling the residual water content of the dried catalyst stream. It will be understood, of course, that a completely dry catalyst is not desirable in any case, since a catalyst which has been too completely dehydrated shows less desirable properties than one which contains a moderate water concentration.

It will be understood that the invention as described may be applied to a variety of catalytic processes where the water content of a catalyst on an adsorptive carrier is important. Its appliaction to the process in the present invention is given by way of a specific illustration, and the same principles can be applied to advantage in many other catalytic processes where its application will be apparent to one skilled in the art.

What is claimed is:

1. The method of reducing the water content of a hydroforming catalyst previously spent by the formation of carbonaceous deposits thereon during the hydroforming reaction and regenerated by combustion to remove said carbonaceous deposits while maintained within a regeneration zone in the form of a turbulent fluid bed, which comprises withdrawing from said fluid bed a major stream of regenerated catalyst and stripping said major stream by passing it through a main stripping zone in countercurrent flow to an inert stripping gas containing less than 1 mol percent of water, separately withdrawing from said regeneration zone a minor stream of regenerated catalyst and passing minor stream through an auxiliary stripping zone maintained within and in heat exchange relationship of said fluid bed of catalyst, maintaining the catalyst within said auxiliary stripping zone for a residence time of from about 10 to 100 times the residence time of the catalyst in said main stream in said main stripping zone, passing an inert stripping gas containing less than 1 mol percent of water in countercurrent flow with the catalyst in said auxiliary stripping zone to remove a greater amount of water therefrom and combining said minor stream of stripped catalyst with said major stream to give a regenerated catalyst stream of desired low water content.

2. The method according to claim 1 wherein the said minor stream entering said auxiliary stripping zone passes first in countercurrent flow with an auxiliary stream of hydrogen-containing gas, said hydrogen-containing gas causing partial reduction of the catalytic component of said hydroforming catalyst and simultaneously stripping from said catalyst water vapor released by this reduction and by the previous regeneration process, and subsequently passing said minor stream of catalyst in countercurrent flow with said inert stripping gas within said auxiliary stripping zone.

3. The method according to claim 1 wherein the stripping for said minor stream of withdrawn catalyst is at least from about 10 to 60 minutes at a stripping temperature in excess of about 1050° F.

4. The method of reducing the water content of a regenerated hydroforming catalyst supported on an alumina-containing base and previously contaminated by the formation of carbonaceous deposits thereon during the hydroforming reaction, which comprises the burning of said deposits from said catalyst introduced into a fluid bed maintained within the regeneration zone, withdrawing a main stream of regenerated catalyst from said fluid bed, and stripping said main stream to remove occluded gas by passing it in countercurrent flow to a stream of inert gas containing less than 1 mol percent of water in a main stripping zone, separately withdrawing from said regeneration zone a minor stream of regenerated catalyst, passing said minor stream through a separate, auxiliary stripping zone maintained within and in heat exchange relationship with fluid bed catalyst in said regeneration zone, passing an inert stripping gas containing less than 1 mol percent of water in countercurrent flow with said minor stream and maintaining the catalyst within said auxiliary stripping zone for a residence time of from about 10 to 100 times the residence time of the catalyst in said main stream in said main stripping zone thereby stripping a greater amount of water from the catalyst in said minor stream and combining said minor stream of stripped catalyst with said major stream of catalyst to give a regenerated catalyst stream of desired low water content.

5. The method according to claim 4 in which said regeneration process is carried out at a superatmospheric pressure of at least about 200 pounds per square inch, and at temperatures of about 1100°–1300° F.

6. The method according to claim 5 in which said inert stripping gas consists of a recycled stream of flue gas from said regeneration process which has been dried by cooling to a temperature approaching 100° F. at which water vapor in excess of about 0.5 to 1.0 mol percent is condensed out of the gas stream.

7. The method of reducing the water content of a regenerated hydroforming catalyst consisting essentially of molybdena on an alumina-containing base and previously at least partly spent by the formation of carbonaceous deposits thereon during the hydroforming reaction, which comprises introducing a stream of said previously spent catalyst into a fluid bed of catalyst maintained within a regeneration zone, regenerating the catalyst in said fluid bed by combustion with an oxygen-containing gas at a temperature of from about 1100–1200° F., withdrawing a main stream of regenerated catalyst from said fluid bed and stripping said regenerated catalyst to remove occluded gas by passing it in countercurrent flow to a stream of inert stripping gas containing less than 1 mol percent of water in a main stripping zone, separately withdrawing from said regeneration zone a minor stream of regenerated catalyst, passing said minor stream through an auxiliary stripping zone within and in heat exchange relationship with the fluid bed of catalyst in said regeneration zone, passing an inert stripping gas containing less than 1 mol percent of water in countercurrent flow with the catalyst in said minor stream, maintaining the catalyst undergoing stripping in said auxiliary stripping zone at regeneration temperature, controlling the flow rate of catalyst through said auxiliary stripping zone to maintain a catalyst residence time in said auxiliary stripping zone of from about 10 to 100 times the residence time of the catalyst in said main stream in said main stripping zone, thereby stripping a greater amount of water from the catalyst in said minor stream and combining said minor stream of stripped catalyst with said major stream of catalyst to give a regenerated catalyst stream of desired low water content.

References Cited in the file of this patent

UNITED STATES PATENTS

| | | |
|---|---|---|
| 1,429,222 | Briggs | Sept. 19, 1922 |
| 2,403,052 | Cole et al. | July 2, 1946 |
| 2,631,123 | Kaulakis | Mar. 10, 1953 |